June 16, 1925.
A. G. LEGGE
1,542,460
METHOD OF MAKING AND USING ARCH SUPPORTING INSOLES
Filed Sept. 6, 1924   2 Sheets-Sheet 1
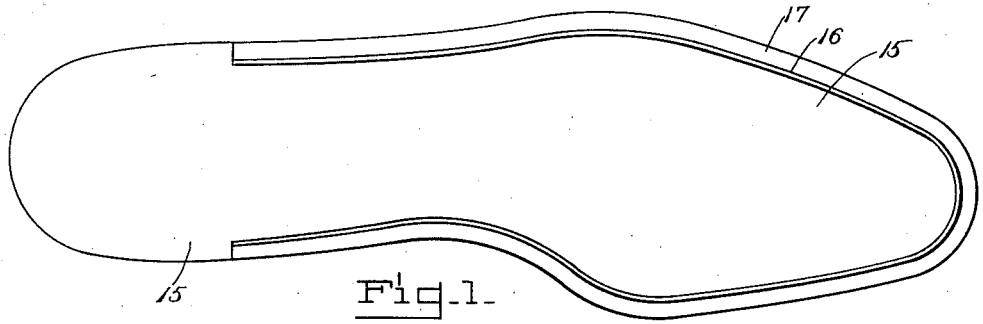
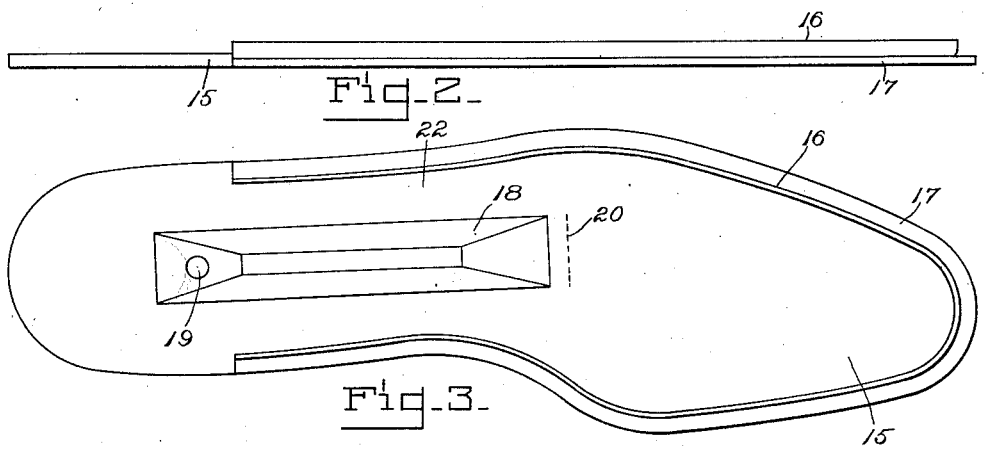
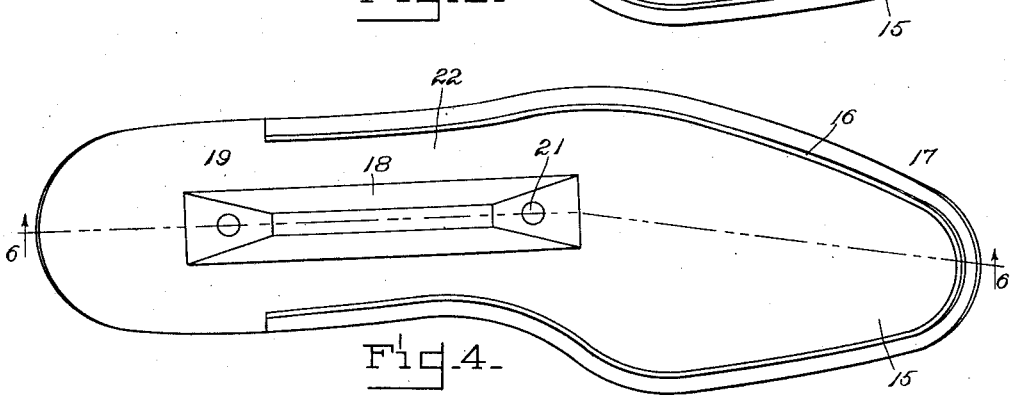
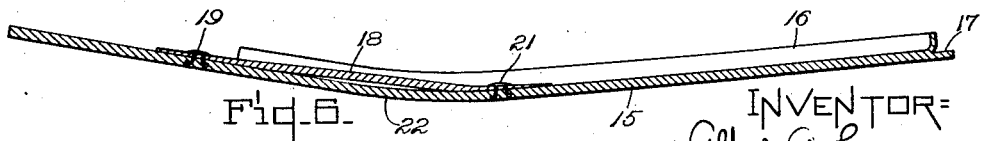
INVENTOR:
Alfred G. Legge
By Macleod, Calver, Copeland & Dike
ATTORNEYS June 16, 1925.
A. G. LEGGE
1,542,460
METHOD OF MAKING AND USING ARCH SUPPORTING INSOLES
Filed Sept. 6, 1924  2 Sheets-Sheet 2
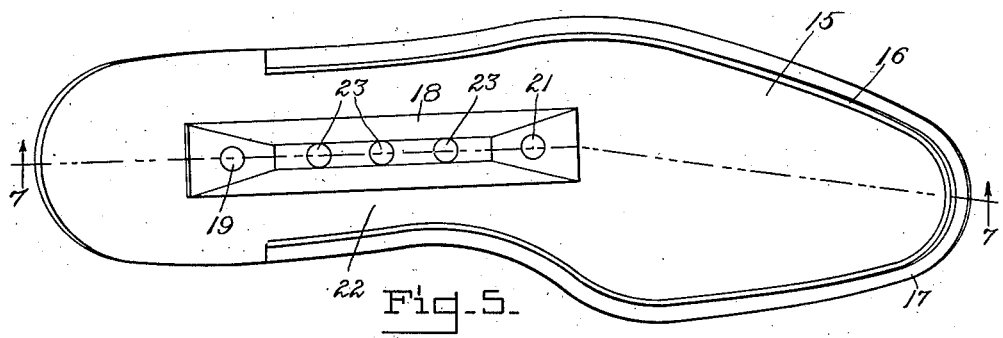
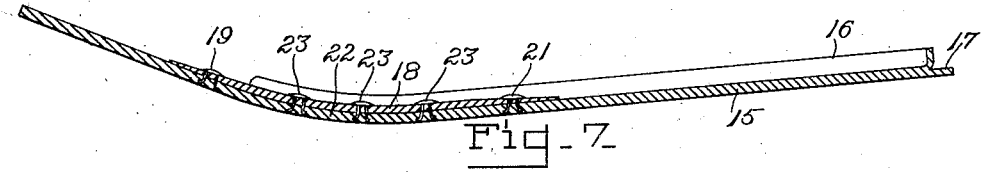
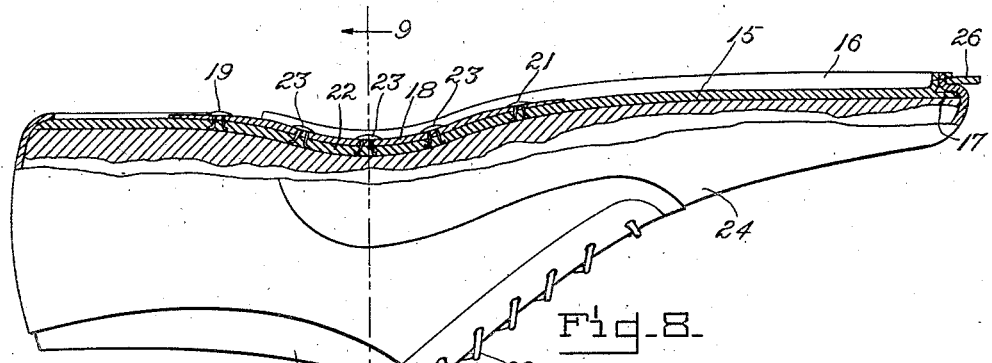
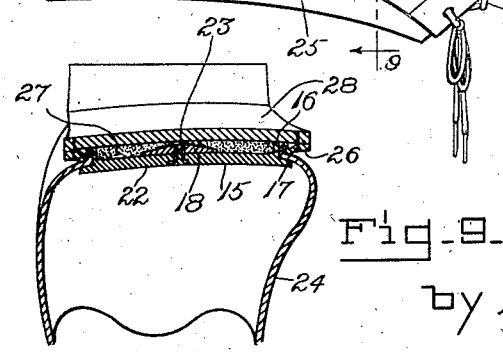

Patented June 16, 1925.

1,542,460

UNITED STATES PATENT OFFICE.

ALFRED G. LEGGE, OF BROCKTON, MASSACHUSETTS.

METHOD OF MAKING AND USING ARCH-SUPPORTING INSOLES.

Application filed September 6, 1924. Serial No. 736,302.

*To all whom it may concern:*

Be it known that I, ALFRED G. LEGGE, a citizen of the United States, residing at Brockton, county of Plymouth, State of Massachusetts, have invented a certain new and useful Improvement in Methods of Making and Using Arch-Supporting Insoles, of which the following is a specification, reference being had therein to the accompanying drawings.

This invention relates to the manufacture of arch supporting boots and shoes, and especially to the insoles used in such shoes and the method of preparing the same and of making shoes by the use thereof, as well as to the shoe so produced.

In the manufacture of the most common type of arch supporting shoes there is employed a metallic shank stiffener of a shape designed to give the desired arch supporting configuration to the insole, which stiffener is, during the manufacture of the shoe, inserted between the insole and outsole after the lasting operation and before bottoming. The insertion of such stiffeners during the manufacture of the shoe involves a special operation which must be carefully performed in order to insure the subsequent retention of the stiffener in its proper place, and the resulting shoe is objectionably stiff in the shank and is difficult to remove from the last without breaking the stiffener. Moreover the metallic stiffeners add materially to the cost of the shoe, while their breakage results in a substantial loss due to defective shoes.

The present invention has for its object the production of a flexible non-metallic arch supporting shoe including an initially or previously prepared insole which can be used in the manufacture of shoes by ordinary methods without the special operation of inserting a stiffener, said insole including novel provision for holding the shank portion thereof in permanently buckled arch supporting form and, while sufficiently rigid downwardly to perform its arch supporting function in a satisfactory way, being nevertheless perfectly flexible upwardly, or in the opposite direction, so as not to interfere with the removal of the shoe from the last and the comfort of the wearer, while permitting the lacing of the shoe to draw the shank portion of the insole snugly against the bottom of the foot, thereby increasing the arch supporting effect in accordance with the principle of the well-known "bandage" type of shoe.

The foregoing and other objects of the invention will best be understood from the following description of one mode of carrying the same into effect as illustrated in the accompanying drawings. It will be understood, however, that the particular constructions and operations described and shown have been chosen for illustrative purposes merely, and that the invention, as defined by the claims hereunto appended, may be otherwise embodied and practiced without departure from the spirit and scope thereof.

In said drawings:

Fig. 1 is a bottom plan view of an insole of standard type, showing the same prior to its preparation in accordance with the invention.

Fig. 2 is an edge view thereof.

Figs. 3, 4 and 5 are views similar to Fig. 1, illustrating successive steps in the preparation of the insole.

Figs. 6 and 7 are longitudinal sections taken substantially on the lines 6—6 and 7—7, Figs. 4 and 5 respectively.

Fig. 8 is a view, partly in longitudinal section and partly in side elevation, of a Goodyear welt shoe having an insole prepared as in the preceding figures, showing said shoe after lasting and welting and before bottoming.

Fig. 9 is a transverse section, taken substantially on the line 9—9, Fig. 8, of the shoe after bottoming, and with the last removed.

In Figs. 1 and 2 is shown an insole 15 of well-known type having the usual lip 16 and feather-edge 17 extending about the fore part and along the sides of the shank. Said insole may be of the usual channeled leather type, with or without reinforcement, or of any of the built-up or composite types well-known in the art.

The preparation of the insole above described for its arch supporting function in accordance with the invention is illustrated in Figs. 3 to 7. For this purpose, a strip 18 of suitable non-metallic material, preferably leather of substantially equal flexibility to the material of the insole, is permanently secured at one end, as by a rivet 19, to the under face of the insole 15 at a point adjacent the rear end of the shank portion of the latter, as shown in Fig. 3, said strip 18 extending longitudinally of said shank portion to a point adjacent the forward end thereof. The forward end of the strip 18 is then drawn forwardly over the bottom of the insole substantially to the line 20 on Fig. 3, and is permanently secured to the insole, as by a second rivet 21, as shown in Figs. 4 and 6. The distance between the points defined by the rivets 19 and 21 measured along the insole being greater than the corresponding distance measured along the strip 18, the operation last referred to causes the intervening shank portion 22 to be upwardly flexed or buckled to a slight extent, as shown in Fig. 6. The portion of the strip 18 between the rivets 19 and 21 is then pressed into engagement with the surface of the insole substantially throughout its length and is permanently secured in this position by one or more additional rivets 23, as shown in Figs. 5 and 7, thereby further buckling the shank portion 22, as shown in the latter figure, and permanently holding the same in upwardly buckled position. This curvature of the shank portion of the insole is due to the fact that the resulting laminated structure includes a ply 18 at the inner side of the curve of less length than the ply 22 at the outer side of the curve.

It will be seen that the insole above described may readily be assembled with an upper 24 upon a last 25 and, as shown in Fig. 8, lasted in the usual manner, the welt 26 (in the case of a Goodyear welt shoe) being also attached, and the shoe subsequently bottomed by the insertion of the usual filling material 27 and the attachment of the outsole 28, as shown in Fig. 9, all in accordance with standard processes without the special operation of inserting and securing a shank stiffener.

In the resulting shoe the buckled shank portion 22 of the insole affords adequate support to the arch of the foot without the use of a metallic stiffener and without impairing the upward flexibility of this portion of the shoe. The shoe can, therefore, be readily removed from the last without difficulty and without danger of breaking. Moreover, by reason of the upward flexibility of the insole, the latter, when the shoe is laced tightly upon the foot, tends to be drawn upwardly, by the tension of the lacing devices 29, under the instep so as to fit the latter still more snugly, in the same way as in the "bandage" type shoe, while affording a much firmer and more satisfactory support to the arch than is possible in shoes of the latter type.

Having thus described my invention, I claim:

1. The herein described method of forming arch supporting insoles which consists in permanently securing to the bottom of an insole, at a point adjacent one end of the shank thereof, one end of a strip of non-metallic material, flexing the shank portion of said insole, and permanently securing the opposite end of said strip to the bottom of said insole at a point adjacent the opposite end of said shank and at a greater distance from said first named point measured along said insole than along said strip.

2. The herein described method of forming arch supporting insoles which consists in permanently securing a strip of material to the bottom of the insole at points, adjacent the opposite ends of the shank, at a greater distance from one another measured along the insole than along said strip, and permanently securing said strip to said insole at one or more points intermediate said first named points.

3. The herein described method of forming arch supporting insoles which consists in permanently securing a strip of non-metallic material to the bottom of the insole at points, adjacent the opposite ends of the shank, at a greater distance from one another measured along the insole than along said strip, and permanently securing said strip to said insole at one or more points intermediate said first named points.

4. The herein described method of making boots and shoes which consists in initially preparing an insole by securing to the under side of the shank portion thereof a strip of flexible, non-metallic material of less length than the corresponding portion of the shank so as to hold the latter in upwardly buckled form, and subsequently assembling said insole with an upper on a last and lasting and bottoming the shoe.

5. The herein described method of making boots and shoes which consists in initially preparing an insole by securing to the under side of the shank thereof the ends of a flexible strip of less length than the corresponding portion of the shank and securing said strip to said insole at one or more points intermediate its ends, and subsequently assembling said insole with an upper on a last and lasting and bottoming the shoe.

6. The herein described method of making boots and shoes which consists in initially preparing an insole by securing to the under side of the shank thereof the ends of a flexible non-metallic strip of less length than the corresponding portion of the shank and securing said strip to said insole at one or more points intermediate its ends, and subsequently assembling said insole with an upper on a last and lasting and bottoming the shoe.

In testimony whereof I affix my signature.

ALFRED G. LEGGE.